United States Patent
Samuelson et al.

(10) Patent No.: US 10,500,822 B2
(45) Date of Patent: Dec. 10, 2019

(54) LINING ELEMENT

(71) Applicant: Trelleborg Izarra SA, Alava (ES)

(72) Inventors: Carl Samuelson, Trelleborg (SE);
Tommy Pettersson, Trelleborg (SE);
Francisco J. Arbulo Montoya, Avila (ES)

(73) Assignee: Trelleborg Izarra SA (ES)

( * ) Notice: Subject to any disclaimer, the term of this patent is extended or adjusted under 35 U.S.C. 154(b) by 108 days.

(21) Appl. No.: 15/543,468

(22) PCT Filed: Jan. 15, 2016

(86) PCT No.: PCT/EP2016/000067
§ 371 (c)(1),
(2) Date: Jul. 13, 2017

(87) PCT Pub. No.: WO2016/113138
PCT Pub. Date: Jul. 21, 2016

(65) Prior Publication Data
US 2017/0348946 A1     Dec. 7, 2017

(30) Foreign Application Priority Data

Jan. 16, 2015 (SE) ...................................... 1550034

(51) Int. Cl.
*B32B 25/04* (2006.01)
*B32B 5/02* (2006.01)
(Continued)

(52) U.S. Cl.
CPC .............. *B32B 25/042* (2013.01); *B32B 5/02* (2013.01); *B32B 25/08* (2013.01); *B32B 25/10* (2013.01);
(Continued)

(58) Field of Classification Search
CPC .................................................... B32B 25/042
(Continued)

(56) References Cited

U.S. PATENT DOCUMENTS

| 3,981,117 A | 9/1976 | Dehlen |
| 7,416,236 B2 | 8/2008 | Boddie et al. |

(Continued)

FOREIGN PATENT DOCUMENTS

| AU | 280437 | 12/1964 |
| AU | 295928 | 9/1979 |

(Continued)

OTHER PUBLICATIONS

Trellex Wear Protection Solutions (Metso Minerals), Brochure No. 2263-10-08-MBL/Trelleborg-English, Aug. 2010, 72 pages.
(Continued)

*Primary Examiner* — Brent T O'Hern
(74) *Attorney, Agent, or Firm* — Fishman Stewart PLLC (57) ABSTRACT

A lining element includes at least three layers and is configured to be mounted to a structure exposed to wear. The lining element has a wear-impeding polymer layer, an energy-absorbing polymer layer and a reinforcing polymer layer. The reinforcing layer is located adjacent the structure exposed to wear, whereas the energy-absorbing layer is located between the reinforcing layer and the wear-impeding layer. The wear-impeding layer is located on top of the energy-absorbing layer.

20 Claims, 4 Drawing Sheets

(51) Int. Cl.
*B32B 25/08* (2006.01)
*B32B 25/10* (2006.01)
*B32B 27/12* (2006.01)

(52) U.S. Cl.
CPC .......... *B32B 27/12* (2013.01); *B32B 2250/24* (2013.01); *B32B 2264/108* (2013.01); *B32B 2307/554* (2013.01); *B32B 2307/746* (2013.01); *B32B 2605/00* (2013.01)

(58) Field of Classification Search
USPC ........................................................ 428/99
See application file for complete search history.

(56) References Cited

U.S. PATENT DOCUMENTS

| | | | |
|---|---|---|---|
| 7,618,075 | B2 | 11/2009 | Boddie et al. |
| 2004/0026959 | A1 | 2/2004 | Kostecki |
| 2008/0084083 | A1* | 4/2008 | Boddie .................. B60R 11/00 296/39.1 |
| 2008/0317992 | A1 | 12/2008 | Malmberg |
| 2014/0312642 | A1 | 10/2014 | Amstutz et al. |
| 2016/0194035 | A1 | 7/2016 | Lu et al. |

FOREIGN PATENT DOCUMENTS

| | | |
|---|---|---|
| AU | 3393578 A | 9/1979 |
| CN | 204383346 U | 6/2015 |
| DE | 2830344 A1 | 1/1980 |
| DE | 4344600 A1 | 3/1995 |
| EP | 0 142 716 A2 | 5/1985 |
| EP | 0142716 A2 | 5/1985 |
| EP | 1901978 A1 | 3/2008 |
| EP | 2607160 A1 | 6/2013 |
| FR | 2415854 A1 | 8/1979 |
| WO | WO-2006/132582 A1 | 12/2006 |
| WO | WO-2012103927 A1 | 8/2012 |
| WO | WO-2016025526 A1 | 2/2016 |

OTHER PUBLICATIONS

Sandvik Wear Protection, B944-001 EN, Sandvik AB 2008, 28 pages.
International Search Report for PCT/EP2016/000067.

* cited by examiner

LINING ELEMENT

CROSS-REFERENCE TO RELATED APPLICATIONS

This application claims priority to International Patent Application No. PCT/EP2016/000067, filed on Jan. 15, 2016, and Swedish Patent Application No. 1550034-1, filed on Jan. 16, 2015, the contents of both of which are incorporated by reference in their entireties.

TECHNICAL FIELD

The present invention relates to a multilayer lining element for protecting an underlying structure from wear.

BACKGROUND

In heavy industries, like e.g. construction and mining, loads of gravel, rocks and stone need to be transported or moved. This is done by haulers which are loaded by an excavator or loader. The rocks and stones are often heavy and they may be pointy. They may damage or miss shape the hauler bucket. Also lighter gravel exposes the structure to wear, particularly when it is unloaded. In this case the bucket is exposed to a sliding wear, which it also needs to resist. Therefore it is important both to protect the hauler bucket and to protect the hauler operator from noise and impacts. Thus, it is necessary to provide an energy and noise absorbing lining in the hauler bucket.

For many years, rubber linings provided with a backing plate of metal have been used in applications with high abrasion and noise. However, these lining systems are often very heavy, due to the metal, and sometimes difficult to attach to an underlying structure. One example of such a liner is a wear plate called "Trellex PP" described in the Handbook "Wear lining and sheeting" version 1.2 issued by the Swedish company Metso Mineral (Sweden AB). This wear plate comprises a wear rubber attached to a bottom mounting plate of steel. The "Trellex PP" liner exhibits all the above mentioned drawbacks, since it is high-weight and difficult to mount to the underlying structure. Further, it is primary a wear plate and therefore it does not have sufficient energy absorption properties for certain applications. For instance, this kind of wear plate can be unsuitable in environments where it is desired to reduce vibrations or noise as well. The mounting plate of steel makes the individual elements difficult to work and it is hard to adjust the shape of the wear plate to fit a certain area. The heavy metal also requires heavy lifting equipment to handle the wear plates.

Due to the above mentioned drawbacks, it has oftentimes not been possible to assemble the known lining systems on a factory assembly line which makes existing lining systems expensive.

A further known type of lining system is disclosed in US2008/0317992A1 which is made up of polyurethane or rubber plates. A problem with these liner elements is the difficulties in attaching it to a foundation.

Another lining system is disclosed in WO2006/132582A1 which has wear-resistant members of a ceramic material embedded in a rubber material. A ceramic wear material may be advantageous for protecting against sliding wear, but it is brittle and may crack when the lining is exposed to hard impacts. Also, both the above mentioned lining systems need to be custom made for each truck, hauler or other equipment or area to be protected and may thus not be assembled on a factory line. This is both expensive and inflexible.

A known material having a layered structure is disclosed in EP0142716A2. This sandwich material comprises at least three layers with different hardness. In this document it is however not disclosed how the sandwich material is supposed to be used. For instance, it is not described how to attach the sandwich material to an underlying structure.

From the above it is understood that there is room for improvements.

SUMMARY

An object of the present invention is to provide a new type of lining element which is improved over prior art and which eliminates or at least mitigates the drawbacks discussed above. More specifically, an object of the invention is to provide a lining element that is light weight and easy to assemble, at the same time as high wear resistance, noise reduction and energy absorbing properties are maintained. These objects are achieved by the technique set forth in the appended independent claims with preferred embodiments defined in the dependent claims related thereto.

In a first aspect, a wear-impeding lining element based on a combination of layers is provided. This novel multilayer wear-impeding assembly comprises a lining element which includes at least three layers and which is configured to be mounted to a structure exposed to wear. The multilayer lining element has a wear-impeding layer comprising a polymer material, an energy-absorbing layer comprising a polymer material and a reinforcing layer comprising a polymer material with at least one reinforcement embedded in the polymer material of the reinforcement layer. The multilayer assembly is arranged in such way, that the reinforcing layer is located adjacent the structure exposed to wear, whereas the energy-absorbing layer is located between the reinforcing layer and the wear-impeding layer. Then the wear-impeding layer is located on top of the energy-absorbing layer.

This multilayer lining element is advantageous since it contributes to reduced noise in harsh working environments and it also improves the protection of the underlying structure. Further, compared to a traditional wear plate with a bottom mounting plate of steel, e.g. the "Trellex PP" liner described above, the weight is reduced and the wear and damping properties are improved. Also, the flexibility to customize the geometry of each plate is enhanced, the installation and assembly is easier and the adhesiveness of loaded/handled material is reduced by the present lining element.

An advantage with the reinforcement of the inventive lining element is that it is lightweight. Another advantage is that the wear plate is easy to attach to the structure exposed to wear or to another foundation in need of protection. This is due to limited elastics and increased tearing strength of the lining.

In yet another embodiment, the reinforcement of the reinforcing layer comprises at least one textile sheet and it may preferably include a number of overlapping fine-mesh textile sheets. By this kind of reinforcement, the reinforcing layer provides the lining element with very favourable properties in terms of for instance suitable stiffness which facilitates the mounting of the liner.

Preferably, the wear-impeding layer comprises a homogenous low friction polymer material. This is advantageous since e.g. gravel sliding off a hauler bucket is less likely to form lumps or to get stuck. Mud slides off the bucket surfaces more easily, and the traditional heating of the bucket can be eliminated.

In one embodiment, the energy-absorbing layer comprises natural or synthetic rubber material. This material is favourable since it has good shock, energy and sound absorbing properties which protect the structure in need of protection from wear, as well as the operator from noise and shock. The synthetic rubber may be particularly advantageous since it is often cheaper than natural rubber, while maintaining the same favourable properties.

The lining element may comprise a further or additional layer located between the reinforcing layer and the energy-absorbing layer, or between the energy-absorbing layer and the wear-impeding layer. The additional layer may alternatively be placed anywhere else in the multilayer structure. This further layer is advantageous since it provides the lining element with additional advantageous features like stability, strength or protection. The additional features depend on where the additional layer is placed, and what material or materials it comprises. The additional layer may, as one example, be used as an indicator showing when the wear-impeding layer is worn down if it is provided directly below the wear-impeding layer and dyed in a differing colour. Another example is that the additional layer comprises a reinforcing textile. It is favourable to place such additional reinforcing layer e.g. between the wear-impeding layer and the energy-absorbing layer. There between it protects the softer energy-absorbing layer from being penetrated by pointy goods. In one embodiment, there may be more than one additional layer. E.g. the lining element may be provided with both a protective textile reinforced layer, and a wear indication layer.

The further layer may comprise homogenous polymer material, and it may be a reinforcing layer. Preferably, this further layer comprises textile reinforcement. A reinforced material is advantageous since it, when placed between the wear-impeding layer and the energy-absorbing layer, protects the soft energy-absorbing layer from penetration of pointy rocks or the like.

In one embodiment, the thickness of the wear-impeding layer is about 10-150 mm. The wear-impeding layer forms approximately 50-71% of the total thickness of the lining element. Different parts of the stated ranges are advantageous for different applications. The lower part of the above-mentioned interval, about 10-30 mm, is suitable for light duty, e.g. gravel, and the higher region is for heavy duty, e.g. boulders or blast stone. Common for the whole interval, independent of application, is that the layer should not be worn down too easily, at the same time as the lining should not get thick and unmanageable.

Preferably, the thickness of the energy absorbing layer is about 5-40 mm. The energy-absorbing layer forms approximately 7-30%, and more preferably 10-20% of the total thickness of the lining element. This is beneficial since the thickness provides the lining with shock-, energy- and noise-reducing properties at the same time as the lining does not get too thick and unmanageable.

The thickness of the reinforcing layer is preferably about 5-20 mm. The reinforcing layer forms approximately 5-25%, and more preferably 7-15%, of the total thickness of the lining element. The advantage of this thickness is to get a manageable and strong lining.

The hardness of the wear-impeding layer may be about 40-90 Shore(A), more preferably about 50-75 Shore(A). This hardness of the wear-impeding layer is favourable since it withstands impacts from falling load, but it does not get penetrated by the same.

Preferably, the hardness of the energy-absorbing layer may be about 30-70 Shore(A), more preferably about 35-50 Shore(A). This is advantageous since the energy-absorbing layer absorbs energy and reduces noise efficiently in this interval.

The hardness of the reinforcing layer may be about 65-95 Shore(A). This is favourable since a stiff bottom layer is more reinforcing than a soft one. Also, since the attachment to the underlying structure is made using the reinforcing layer it is beneficial to use a stiff layer, since this makes the mounting of the lining element easier by means of fastening bolts. A soft material may stretch and loosen from the fastening bolts, as has been experienced with prior-art arrangements.

In one embodiment, the wear-impeding layer comprises reinforcing fillers, for instance carbon black. This is advantageous since the fillers provide the wear-impeding layer with higher wear resistance and an improved breaking strength.

According to one embodiment, the lining element is configured to be fastened to the structure exposed to wear by means of bolts. One advantage of this attachment is the robustness of bolts. A lining element attached by several bolts is less likely to loosen unintentionally removed. Another advantage with using fastening bolts is that the lining elements are individually replaceable by means of detachable bolts.

The inventive concept is based on the idea to provide a wear-impeding lining element having at least three layers and being configured to be mounted to a structure exposed to wear, wherein the lining element comprises: (i) a wear-impeding layer based on a polymer material, (ii) an energy-absorbing layer based on a polymer material and also (iii) a reinforcing layer based on a polymer material. The reinforcing layer is adjacent to the structure exposed to wear, whereas the energy-absorbing layer is sandwiched between the reinforcing layer and said wear-impeding layer. Finally, the wear-impeding layer is placed on top of the energy-absorbing layer.

In one embodiment, the reinforcing layer is based on a homogenous polymer material. An advantage with a lining element comprising such a polymer reinforcement is that it is lightweight.

In a second aspect of the invention, a lining system comprising a number of lining elements is provided. The lining elements are arranged to cover areas of a structure which are exposed to wear. This is advantageous since a system of lining elements effectively protects a surface from wear and/or other damages.

In a third aspect of the invention, a kit comprising a number of lining elements is provided. The kit also includes a number of fastening bolts. An advantage of the kit is that it is easily delivered to the user, who in turn gets all the necessary lining elements, ready to be mounted.

In a fourth aspect of the invention, there is provided a use of a multilayer assembly of at least three polymer layers for making a lining element to be attached to a surface exposed to wear. The multilayer assembly comprises a wear-impeding polymer layer and a reinforcing polymer layer as well as an energy-absorbing polymer layer sandwiched there between. In use, the reinforcing layer is adjacent the surface and it has preferably a reinforcement embedded in its polymer material.

A benefit with this use is to protect the surface exposed to wear from being worn down.

BRIEF DESCRIPTION OF THE DRAWINGS

Embodiments of the invention will be described in the following, reference being made to the appended diagrammatical drawings which illustrate non-limiting examples of how the inventive concept can be reduced into practice.

DETAILED DESCRIPTION OF EMBODIMENTS

Hereinafter, certain embodiments will be described more fully with reference to the accompanying drawings. The invention may, however, be embodied in many different forms and should not be construed as limited to the embodiments set forth herein; rather, these embodiments are provided by way of example so that this disclosure will be thorough and complete, and will fully convey the scope of the invention, such as it is defined in the appended claims, to those skilled in the art.

Figure 1:
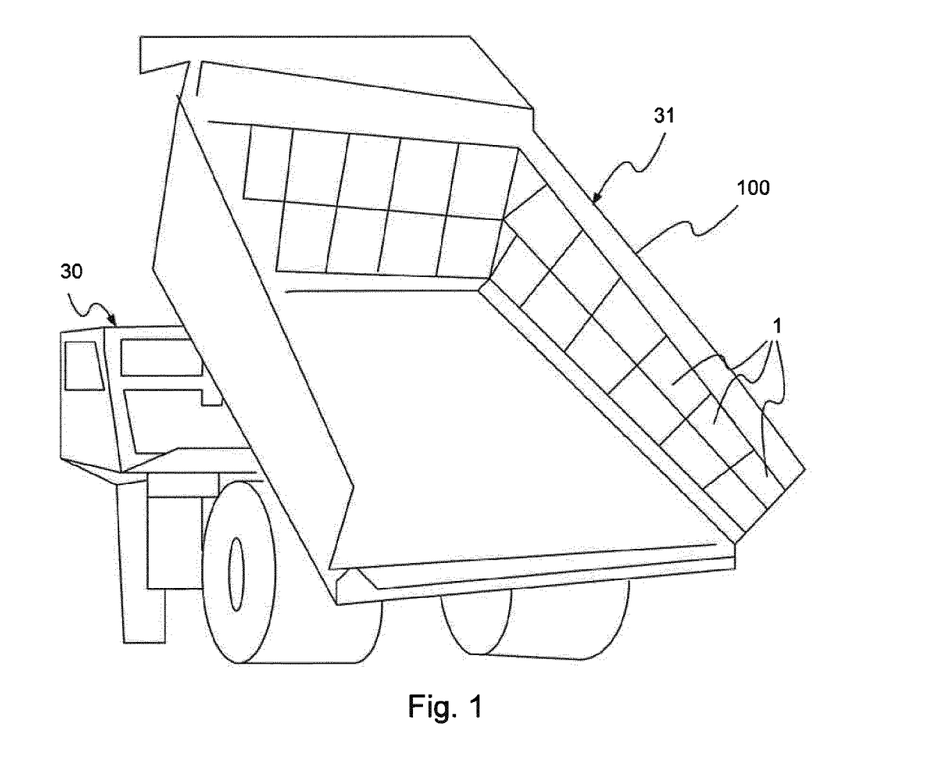
FIG. 1 is a schematic, isometric view of a hauler bucket with a lining system attached thereto.
Figure 2:
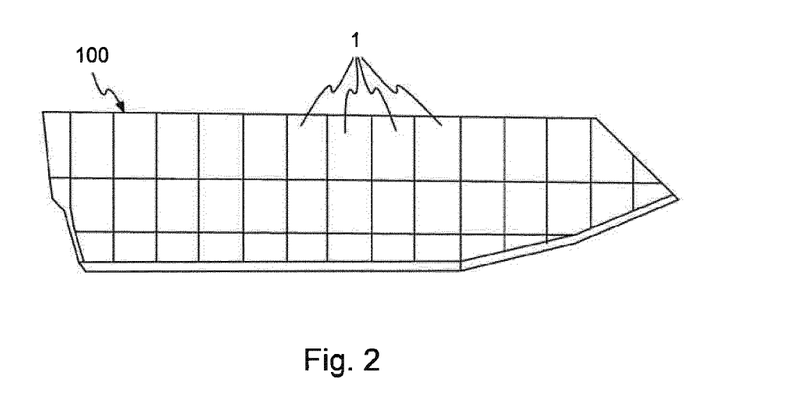
FIG. 2 is a schematic view of a lining system attached to a side wall of the hauler bucket.

A hauler truck 30 with a bucket 31 lined with lining plates 1 according to one embodiment is shown in FIG. 1. One of the hauler's 30 side walls 100 is shown in FIG. 2 illustrating an arrangement of lining plates 1. As can be seen, the lining plates 1 have different sizes and shapes depending on their location in the bucket 31.

Figure 3:
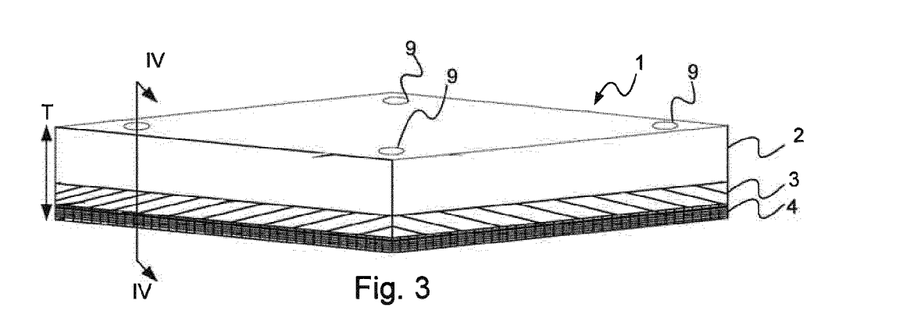
FIG. 3 is an isometric view of a lining element shown in FIG. 2.

In FIG. 3 an isometric view of the multi layer lining or lining element 1 according to one embodiment is shown. In the following, the lining element 1 is also referred to as a wear-impeding member or structure as well as a wear plate. The basic structure of the lining element 1 comprises a combination of three layers 2, 3, 4 of polymer materials.

Figure 4:
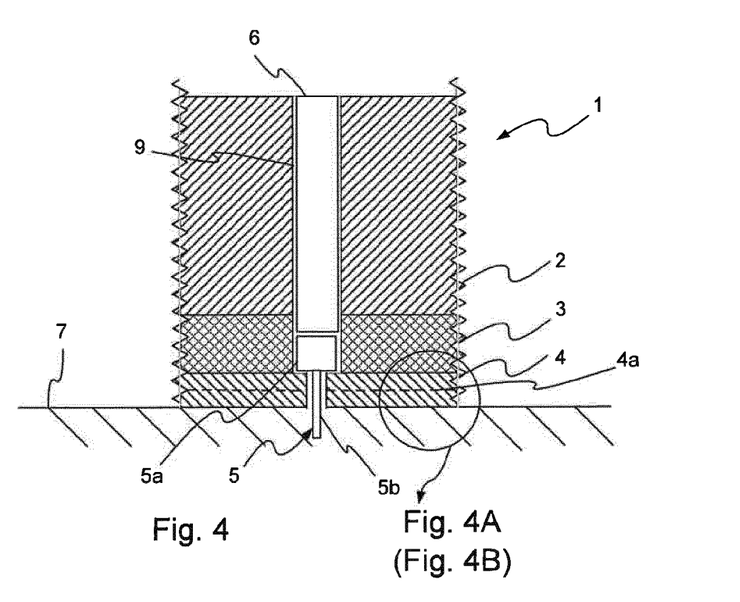
FIG. 4 is a partial sectional view of the lining element according to an embodiment.
Figure 5:
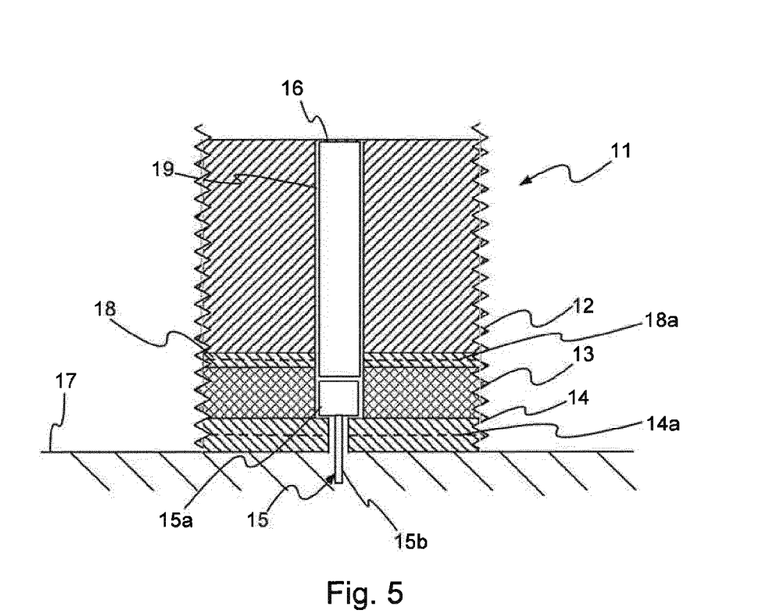
FIG. 5 is a sectional view of the lining element according to another embodiment.

First, a reinforcing layer 4 is provided, which, when the lining element 1 is mounted, will be located closest to a surface or foundation 7 to be protected (e.g., referred to as a lower or interior layer) (see FIGS. 4-5). Secondly, an energy-absorbing layer 3 is provided on top of the reinforcing layer 4 (e.g., referred to as an intermediate or middle layer). Thirdly, a wear-impeding layer 2 is provided on top of the energy-absorbing layer 3 (e.g., referred to as an upper or exterior layer).

The thickness of the lining 1 may vary according to the specific applications. For a light duty application, e.g. gravel, the thickness could be as low as 20 mm and for heavy duty the thickness could be up to 210 mm.

Through all of the polymer layers 2, 3, 4 longitudinal bores 9 are provided. The number of bores may depend on the size and shape of the lining element 1. The materials, features and functions of the polymer layers 2, 3, 4, as well as the attachment of the wear plate 1 to the foundation 7 will be described in more detail hereinafter in conjunction with FIG. 4 and FIG. 5.

With reference to FIG. 4, a portion of the lining element 1 of FIG. 3 is shown in cross section. The wear-impeding layer 2 comprises a polymer material with a certain amount of reinforcing fillers which provide the layer 2 with higher wear resistance and an improved breaking strength. An example of reinforcing filler is carbon black. Preferably, the material of the layer 2 is natural rubber or a blend of synthetic elastomers. The combination of the sandwiched multiple layers 2, 3, 4 making up the multilayer polymer lining element 1 results in an efficient product which is improved over prior art in that it is securely attachable to an underlying structure and that it has improved shock absorbing properties thanks to the combination of both a wear layer and an energy absorbing layer.

Further, the wear-impeding polymer layer 2 may for some applications be treated to have low friction. This is done by mixing a blend of certain chemicals into the rubber mixture. For example, these chemicals may be waxes or oils, e.g. paraffin oil. The low friction chemicals are thus evenly distributed throughout the whole layer 2, making it homogenous. Thus the entire wear layer 2 is friction treated and the friction surface may not be worn off. If the foundation 7 to which the lining element 1 is mounted is e.g. a hauler truck bucket, the load slides off more easily with a friction treated layer 2. Hereby it is possible to avoid heating of the hauler bucket, which otherwise may be necessary in order to make the load slide off.

The wear-impeding polymer layer 2 may have different hardness due to the application, and preferably the hardness is about 40-90 Shore(A), more preferably the hardness is about 50-75 Shore(A). The hardness of the layer 2 is obtained by the amount of reinforcing fillers, and by the type of filler. In summary, the wear-impeding layer 2 has anti-wear properties and low adhesiveness. As mentioned above, it may also be friction treated. The thickness of the wear-impeding layer 2 is preferably about 10-150 mm. It constitutes approximately 50-71% of the total thickness of the multi layer rubber lining element 1. The total thickness of the lining element 1 is approximately 20-210 mm.

The energy-absorbing layer 3 comprises a polymer material, preferably a soft natural rubber material. The hardness of the polymer material is preferably in the approximate range 30-70 Shore(A), and more preferably about 30-50 Shore(A). The purpose of the energy-absorbing layer 3 is to absorb energy from load falling onto the lining and to reduce noise. The thickness of the energy-absorbing layer 3 is preferably about 5-40 mm.

Depending on the application, the energy-absorbing layer 3 may comprise natural rubber (NR) or a mixture of natural rubber (NR) and butadiene rubber (BR). Alternatively, it could comprise NR and styrene butadiene (SBR). Another alternative is to use a combination of NR, BR and SBR. Further options are to exclude NR from the above mentioned combinations and to use a purely synthetic rubber.

A preferred thickness of the energy-absorbing polymer layer 3 is about 5-40 mm. The energy absorbing layer 3 constitutes approximately 7-30%, more preferably about 10-20%, of the total thickness of the lining element 1.

Figure 4A:
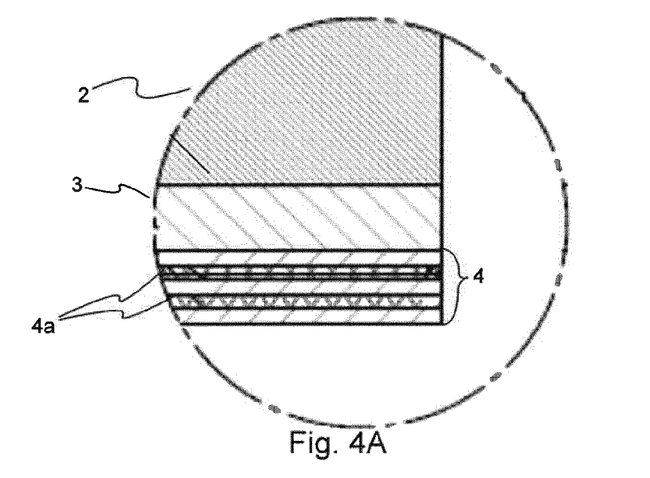
FIG. 4A is a detail of the lining element in FIG. 4, with two reinforcements.
Figure 4B:
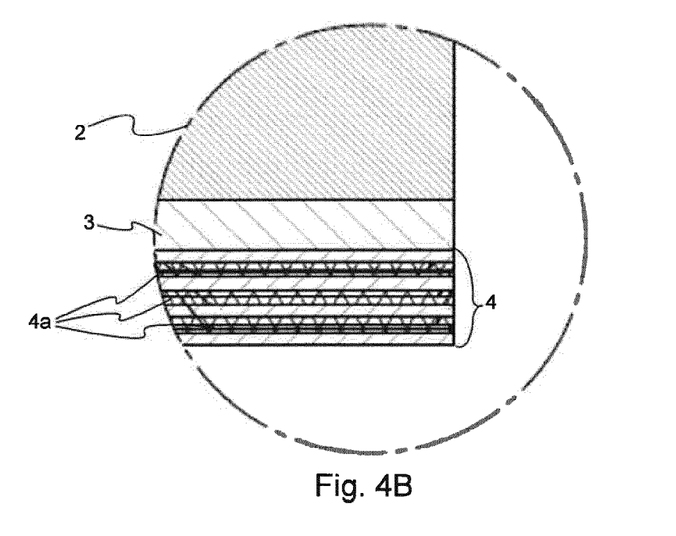
FIG. 4B is a detail of the lining element in FIG. 4, with three reinforcements.

As best shown in FIGS. 4A-4B, the reinforcing layer 4 comprises a polymer material in the shape of a composite with reinforcement. Hence, the reinforcing polymer layer 4 is reinforced by at least one sheet of embedded textile 4a comprising a fine-mesh fabric of aramid, polyester, polyamide or similar. The textile reinforcement 4a is constructed by layering fabric and thin layers of rubber. The fabrics are arranged in groups of two. One or more groups of two reinforcement sheets of fabric can be provided in the reinforcing polymer layer 4. In FIG. 4A two groups are shown, i.e. the reinforcement layer 4 comprises four sheets of fabric. In FIG. 4B three groups of fabric are shown, i.e. the reinforcement layer 4 comprises six sheets of fabric. In other embodiments, the number of fabric sheets may vary. For example, one group of fabric sheets may comprise one sheet, or it may comprise three or more sheets. The number of groups of fabric sheets may vary as well, e.g. between 2 and 10, depending on the application and the type of wear the liner is supposed to be exposed to.

The reinforcing polymer layer 4 has a hardness of about 65-95 Shore(A), preferably about 90 Shore(A), and it is about 5-20 mm thick. Preferably, the reinforcing layer 4 constitutes 5-25%, and more preferably about 7-15%, of the total thickness of the lining element 1. The reinforcing layer 4 could in some applications comprise a homogenous polymer material, or, as an alternative to the textile reinforcement 4*a*, comprise a thin steel grid, or reinforcing fibers.

Through the multilayer structure 1 extends the bore 9 which has a slightly larger diameter through the wear-impeding layer 2 and the energy-absorbing layer 3 than through the reinforcing layer 4. A fastening bolt 5 is placed in the bore 9 and the head 5*a* of the bolt 5 abuts the upper surface of the reinforcing layer 4, i.e. the surface adjacent the energy-absorbing layer 3. The shaft 5*b* of the bolt 5 extends through the reinforcing layer 4 and into the foundation 7. The diameter of the head 5*a* of the bolt 5 is slightly larger than the diameter of the bore 9 through the reinforcing layer 4. Above the bolt 5, inside the bore 9, an elongate polymer plug 6 is inserted to cover or fill out the bore 9. Subsequently, the lining element 1 is kept in place by means of the bolts 5.

Conventional rubber linings are attached by bolts as well, but a problem with these rubber linings is that the rubber is stretchable. The conventional lining element is attached to a structure by a counter-sinked bolt, just as described above. The bolt head rests on the lining element at some level, depending on how far the bolt is counter-sinked. When the lining element is exposed to external stresses, there is a risk that the rubber surrounding the bolt stretches, such that the bolt hole becomes enlarged in such an extent that the bolt head can pass through it. Thus, the lining element becomes detached from the structure it is supposed to protect. In summary, if a lining element comprising a stretchable material is fastened with bolts, the rubber material may be stretched around the bolt and thereby the lining plate may come loose.

With the lining elements described in this application, one purpose of the reinforcing layer 4 is to improve the attachment of the lining element 1 to the foundation 7, which is e.g. a hauler bucket. Each lining element 1 is attached to the foundation 7 by means of bolts 5, whose heads 5*a* together with the reinforcement of layer 4 lock the lining plate 1 in place. The reinforcement 4*a* adds stability to the layer 4 and secures the plate. Thanks to the reinforcing layer 4*a* it is hardly possible for the rubber of the reinforcing layer 4 to stretch, and thus the bore cannot become enlarged such that the bolt head may pass through it.

Therefor, conventional linings are often reinforced with metal plates closest to the foundation 7, in order to avoid the problem with stretching rubber and to fasten the plates more easily to the foundation 7. But, in the meantime these linings become very heavy. Further, due to the bottom mounting plate of metal it is not possible to cut a conventional, metal-reinforced lining into smaller pieces after manufacturing in a relatively easy manner. Even if the reinforcement is a metal grid it is difficult to divide the lining pieces into smaller sections with out heavy tools. Thanks to the textile reinforcement 4*a* of the reinforcing layer 4 of the lining element 1, it is possible to quite easily divide larger pieces of liners into smaller, customized sections. These can be placed like a "mosaic" of pieces to cover areas with complex geometry. This opens up for tailor-made lining assemblies, as well as for the end user to customize a spare lining piece to fit in the place of a worn-out lining element, regardless the shape of the worn-out piece.

Thanks to the preferred material of the reinforcing layer 4, the weight of the lining element, and thus the total weight of the heavy duty vehicle lined with a system of lining plates 1, can be reduced by up to a tonne. It is thus possible to increase the load of the hauler accordingly, which leads to less transportation and in the end lower fuel consumption and lower emissions. The lower weight also allows for an installation without heavy lifting equipment.

In FIG. 5, a lining element 11 according to a further embodiment is shown. This lining element 11 comprises a wear-impeding layer 12, an energy-absorbing layer 13 and a reinforcing layer 14 with embedded textile reinforcement 14*a*, basically corresponding to the polymer layers 2, 3, 4 described in conjunction with FIGS. 4, 4A and 4B. The lining element 11 of FIG. 5 further includes an additional fourth layer 18 provided between the energy-absorbing layer 13 and the wear-impeding layer 12. The additional layer 18 of this embodiment comprises a polymer with reinforcement 18*a* which preferably is of textile and which protects the energy-absorbing layer 13 from penetration of pointy rocks or other sharp edges hitting the lining 11. The textile reinforcement 18*a* corresponds to the fabric 4*a* described in conjunction with FIGS. 4, 4A and 4B. If the lining 11 is hit by a pointy object and the wear-impeding layer 12 is penetrated, the additional layer 18 protects the softer energy-absorbing layer 13 from being penetrated as well. The lining element 11 is attached to the foundation or structure to be protected 17 by a bolt 15, comprising a head 15*a* and a shaft 15*b*, extending into a bore 19 in the same way as described in conjunction with the lining 1 in FIG. 4. Accordingly, the bore 19 is covered by a polymer plug 16.

In one embodiment, the further layer 18 comprises the same material as the reinforcing layer 14. In another embodiment the layer 18 does not comprise textile reinforcement, but a homogenous polymer or rubber layer.

It is also possible to use more layers than four and the additional layers may be located anywhere in the multilayer layer assembly.

Figure 6:
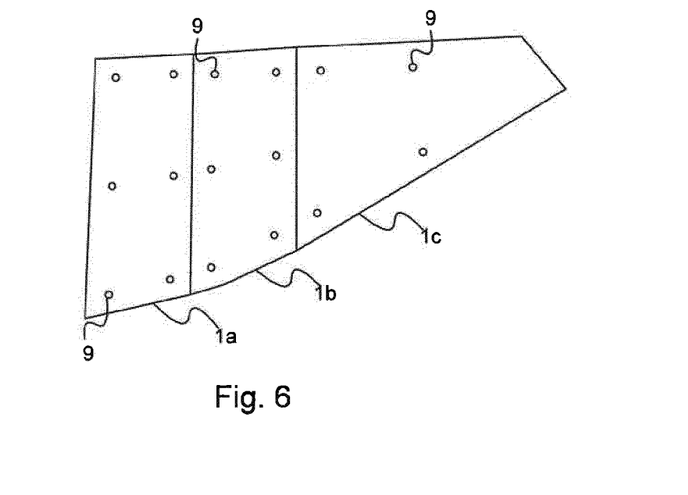
FIG. 6 is a top view of a part of the lining system in FIG. 2.

In FIG. 6 there is shown an assembly of three lining elements 1*a*, 1*b*, 1*c* designed in accordance with an embodiment of the invention. The lining elements 1*a*, 1*b*, 1*c* all have different shapes and sizes in order to match a part of the side wall of the hauler bucket 31 shown in FIGS. 1 and 2. The lining pieces 1*a*, 1*b*, 1*c* are all provided with bores 9, for the bolts to be inserted into. The pieces are delivered to the buyer as a kit of pieces to be mounted on a bucket or the like by the customer. The kit also includes a number of fastening bolts for the attachment of the lining elements. When the user installs the lining to his structure, there is no need for pre-drilling in the structure exposed to wear. The holes are made in the underlying structure at the same time as the individual lining plates are attached. There is thus no need for firstly calculating the positions for the holes in the structure and secondly fit the lining pieces to the predrilled holes.

It should be appreciated that the inventive concept is not limited to the embodiments described above, and many modifications are feasible within the scope of the invention set forth in the appended claims. For instance the lining system may be installed on any area exposed to wear, e.g. in mining industry, other types of vehicles in addition to haulers, conveyors, chutes, or any other area that needs protection in an exposed environment. The hardness of the layers can vary between different applications—heavy rocks up to 1000 kg/rock require harder materials, whereas softer materials are appropriate for e.g. gravel. The thicknesses of the layers illustrated in the drawings are not to scale, and they may vary according to different applications. Additional layers may be placed anywhere in the multilayer lining, and they may provide the lining with additional features like increased strength, increased wear resistance, lower friction, among other possibilities.

The invention claimed is:

1. A wear-impeding lining element including at least three layers and configured to be mounted to a structure exposed to wear, said lining element comprising an upper wear-impeding layer comprising a polymer material, an intermediate energy-absorbing layer comprising a polymer material, and a lower reinforcing layer comprising a polymer material with at least one reinforcement embedded in the lower reinforcing layer, wherein the lower reinforcing layer is located adjacent said structure exposed to wear, wherein the intermediate energy-absorbing layer is located between the reinforcing layer and the upper wear-impeding layer, and wherein the upper wear-impeding layer is located on top of the intermediate energy-absorbing layer,
wherein the wear-impeding lining element includes a total thickness from 20 mm to 210 mm,
the lower reinforcing layer having a lower layer thickness forming 5-25% of said total thickness of the wear-impeding lining element, and said lower reinforcing layer having a Shore(A) hardness from 65 to 95,
the upper wear-impeding layer includes a homogenous low friction material, a upper layer thickness forming 50-71% of the total thickness of the wear-impeding lining element, and the upper wear-impeding layer having a Shore(A) hardness from 40 to 90, and
the intermediate energy-absorbing layer having an intermediate layer thickness forming 7-30% of said total thickness of the wear-impeding lining element, and said intermediate layer having a Shore(A) hardness from 30 to 70.

2. The lining element according to claim 1, wherein said at least one reinforcement comprises at least one textile sheet.

3. The lining element according to claim 1, wherein said at least one reinforcement comprises a number of overlapping fine-mesh textile sheets.

4. The lining element according to claim 1, wherein the upper wear-impeding layer comprises a homogenous low friction polymer material.

5. The lining element according to claim 1, wherein the intermediate energy-absorbing layer comprises natural or synthetic rubber material.

6. The lining element according to claim 1, further comprising a lining element layer located between the reinforcing layer and the energy-absorbing layer or between the energy-absorbing layer and the wear-impeding layer.

7. The lining element according to claim 6, wherein the lining element layer comprises a homogenous polymer material.

8. The lining element according to claim 6, wherein the lining element layer comprises textile reinforcement.

9. The lining element according to claim 1, wherein a thickness of the upper wear-impeding polymer layer is about 10-150 mm.

10. The lining element according to claim 1, wherein a thickness of the intermediate energy-absorbing layer is about 5-40 mm.

11. The lining element according to claim 1, wherein a thickness of the lower reinforcing layer is about 5-20 mm.

12. The lining element according to claim 1, wherein a hardness of the upper wear-impeding layer is about 40-90 Shore(A).

13. The lining element according to claim 1, wherein a hardness of the intermediate energy-absorbing layer is about 30-70 Shore(A).

14. The lining element according to claim 1, wherein a hardness of the lower reinforcing layer is about 65-95 Shore(A).

15. The lining element according to claim 1, wherein the upper wear-impeding layer comprises reinforcing fillers.

16. The lining element according to claim 1, further comprising a second lining element being arranged to cover areas of a structure which are exposed to wear.

17. A wear-impeding lining element with at least three layers and configured to be mounted to a structure exposed to wear, comprising:
an upper wear-impeding layer based on a polymer material,
an intermediate energy-absorbing layer based on a polymer material and
a lower reinforcing layer based on a polymer material,
said lower reinforcing layer being adjacent to said structure exposed to wear, said intermediate energy-absorbing layer being sandwiched between said lower reinforcing layer and said upper wear-impeding layer, and said upper wear-impeding layer being placed on top of the intermediate energy-absorbing layer,
wherein the wear-impeding lining element includes a total thickness from 20 mm to 210 mm,
the lower reinforcing layer having a lower layer thickness forming 5-25% of said total thickness of the wear-impeding lining element, and said lower reinforcing layer having a Shore(A) hardness from 65 to 95,
the upper wear-impeding layer includes a homogenous low friction material, a upper layer thickness forming 50-71% of the total thickness of the wear-impeding lining element, and the upper wear-impeding layer having a Shore(A) hardness from 40 to 90, and
the intermediate energy-absorbing layer having an intermediate layer thickness forming 7-30% of said total thickness of the wear-impeding lining element, and said intermediate layer having a Shore(A) hardness from 30 to 70.

18. The lining element according to claim 17, wherein the lower reinforcing layer comprises a homogenous polymer material.

19. A wear-impeding lining element including at least three layers and configured to be mounted to a structure or surface exposed to wear, said lining element comprising:
a lower reinforcing layer which, when the lining element is mounted, is located adjacent said structure or surface exposed to wear; said lower reinforcing layer comprising either a homogenous polymer material or a reinforced polymer material provided with at least one reinforcement embedded in the lower reinforcing layer;

an upper wear-impeding layer comprising a polymer material with reinforcing fillers providing wear resistance and breaking strength; and an intermediate energy-absorbing layer which is sandwiched between said lower reinforcing layer and said wear-impeding layer; said energy-absorbing layer comprising a polymer material including natural or synthetic rubber, wherein the wear-impeding lining element includes a total thickness from 20 mm to 210 mm, the lower reinforcing layer having a lower layer thickness forming 5-25% of said total thickness of the wear-impeding lining element, and said lower reinforcing layer having a Shore(A) hardness from 65 to 95, the upper wear-impeding layer includes a homogenous low friction material, a upper layer thickness forming 50-71% of the total thickness of the wear-impeding lining element, and the upper wear-impeding layer having a Shore(A) hardness from 40 to 90, and the intermediate energy-absorbing layer having an intermediate layer thickness forming 7-30% of said total thickness of the wear-impeding lining element, and said intermediate layer having a Shore(A) hardness from 30 to 70.

20. The lining element according to claim 19, further comprising a second lining element being arranged to cover areas of a structure which are exposed to wear.

* * * * *